(12) United States Patent
Jain

(10) Patent No.: US 11,503,471 B2
(45) Date of Patent: Nov. 15, 2022

(54) MITIGATION OF DDOS ATTACKS ON MOBILE NETWORKS USING DDOS DETECTION ENGINE DEPLOYED IN RELATION TO AN EVOLVE NODE B

(71) Applicant: Fortinet, Inc., Sunnyvale, CA (US)

(72) Inventor: Hemant Kumar Jain, Milpitas, CA (US)

(73) Assignee: Fortinet, Inc., Sunnyvale, CA (US)

( * ) Notice: Subject to any disclaimer, the term of this patent is extended or adjusted under 35 U.S.C. 154(b) by 637 days.

(21) Appl. No.: 16/363,994

(22) Filed: Mar. 25, 2019

(65) Prior Publication Data
US 2020/0314655 A1 Oct. 1, 2020

(51) Int. Cl.
| | |
|---|---|
| H04L 9/40 | (2022.01) |
| H04L 29/06 | (2006.01) |
| H04W 12/122 | (2021.01) |
| H04L 45/7453 | (2022.01) |
| H04W 12/67 | (2021.01) |
| H04W 12/088 | (2021.01) |
| H04W 12/108 | (2021.01) |

(52) U.S. Cl.
CPC ....... H04W 12/122 (2021.01); H04L 45/7453 (2013.01); H04L 63/0236 (2013.01); H04L 63/1458 (2013.01); H04W 12/088 (2021.01); H04W 12/108 (2021.01); H04W 12/67 (2021.01)

(58) Field of Classification Search
CPC ............. H04W 12/088; H04W 12/108; H04W 12/122; H04W 12/67; H04L 63/1416; H04L 63/0236; H04L 63/1458; H04L 45/7453; H04L 2463/146

USPC .......................................................... 726/22
See application file for complete search history.

(56) References Cited

U.S. PATENT DOCUMENTS

| | | | | |
|---|---|---|---|---|
| 9,251,535 | B1* | 2/2016 | Krishna | H04W 28/08 |
| 10,986,067 | B2* | 4/2021 | Monshizadeh | H04L 63/0236 |
| 2011/0113489 | A1* | 5/2011 | Nakhre | H04L 63/1458 |
| | | | | 726/22 |
| 2015/0296424 | A1* | 10/2015 | Xu | H04W 36/0033 |
| | | | | 370/331 |
| 2015/0333991 | A1* | 11/2015 | Liu | H04L 43/0829 |
| | | | | 455/406 |
| 2016/0248682 | A1* | 8/2016 | Lee | H04L 67/146 |

(Continued)

*Primary Examiner* — Haresh N Patel
(74) *Attorney, Agent, or Firm* — HDC Intellectual Property Law, LLP

(57) ABSTRACT

Systems and methods for inspection of traffic between UE and the core network to mitigate DDoS attacks on mobile networks are provided. According to one embodiment, the method involves parsing SCTP packets and monitoring header anomalies to block anomalous packet floods. According to another embodiment, a memory table maintains requesting S1AP-IDs which have sent certain monitored commands and then blocking those which are sending these messages at abnormally high rates. According to yet another embodiment, a packet classifier parses the GTP-U protocol, unwraps the encapsulated IP packet and then monitors layer 3, 4 and 7 rate-based attacks such as UDP, ICMP, SYN, HTTP GET floods and drops them to protect the targeted Internet server as well as mobile infrastructure (e.g., the MME, the SGW, the PGW, and the PDN) downstream from the DDoS mitigation system.

10 Claims, 10 Drawing Sheets

(56) References Cited

U.S. PATENT DOCUMENTS

| | | | |
|---|---|---|---|
| 2016/0344635 A1* | 11/2016 | Lee | H04L 47/20 |
| 2017/0026405 A1* | 1/2017 | Vengalil | H04L 63/1458 |
| 2017/0214607 A1* | 7/2017 | Kim | H04W 28/04 |
| 2018/0302439 A1* | 10/2018 | Hoffmann | H04L 63/1458 |
| 2018/0309784 A1* | 10/2018 | Chen | H04L 69/22 |
| 2018/0316714 A1* | 11/2018 | Gudov | H04L 63/1425 |
| 2019/0045370 A1* | 2/2019 | Al-Fanek | H04W 24/08 |
| 2019/0182266 A1* | 6/2019 | Doron | H04L 63/1425 |
| 2019/0274089 A1* | 9/2019 | Castmo | H04W 48/02 |
| 2019/0387394 A1* | 12/2019 | Chennupati | H04L 12/2898 |
| 2020/0021613 A1* | 1/2020 | Tong | H04L 45/04 |
| 2021/0288942 A1* | 9/2021 | Preda | H04L 65/4084 |
| 2021/0329456 A1* | 10/2021 | Preda | H04W 12/009 |

* cited by examiner

| UE | | eNB | | eNB | | MME |
|---|---|---|---|---|---|---|
| NAS (UE Attach) | ↑ | | ↑ | | | |
| RRC | ↑ | RRC | ↑ | | | |
| PDCP | ↑ | PDCP | ↑ | S1-AP | ↑ | S1-AP |
| RLC | ↑ | RLC | ↑ | SCTP | ↑ | SCTP |
| | | | ↑ | IP | ↑ | IP |
| MAC | ↑ | MAC | ↑ | L2 | ↑ | L2 |
| PHY | ↑ | PHY | ↑ | L1 | ↑ | L1 |

| UE | | eNB | | eNB | | DDoS Mitigation | | MME |
|---|---|---|---|---|---|---|---|---|
| NAS (UE Attach Flood) | ↑ | | | | | NAS | ↑ | NAS |
| RRC | ↑ | RRCP | ↑ | SCTP | ↑ | SCTP | ↑ | SCTP |
| PDCP | ↑ | PDCP | ↑ | | | | | |
| RLC | ↑ | RLC | ↑ | IP | ↑ | IP | ↑ | IP |
| MAC | ↑ | MAC | ↑ | L2 | ↑ | L2 | ↑ | L2 |
| PHY | ↑ | PHY | ↑ | L1 | ↑ | L1 | ↑ | L1 |

FIG. 4

| UE | | eNB | | DDoS Mitigation | | SGW | | SGW | | PGW | | PDN |
|---|---|---|---|---|---|---|---|---|---|---|---|---|
| ICMP Flood + Application | ↑ | | | Legitimate Traffic | ↑ | Legitimate Traffic | ↑ | Legitimate Traffic | ↑ | Legitimate Traffic | ↑ | Application |
| IP | ↑ | | | ↑ | | ↑ | | ↑ | | IP | ↑ | IP |
| PDCP | ↑ | GTP-U | ↑ | GTP-U | ↑ | GTP-U | ↑ | GTP-U | ↑ | GTP-U | ↑ | L2 |
| RLC | ↑ | UDP | ↑ | UDP | ↑ | UDP | ↑ | UDP | ↑ | UDP | | |
| | | IP | ↑ | IP | ↑ | IP | ↑ | IP | ↑ | IP | | |
| MAC | ↑ | L2 | ↑ | L2 | ↑ | L2 | ↑ | L2 | ↑ | L2 | | |
| PHY | ↑ | L1 | ↑ | L1 | ↑ | L1 | ↑ | L1 | ↑ | L1 | ↑ | L1 |

MITIGATION OF DDOS ATTACKS ON MOBILE NETWORKS USING DDOS DETECTION ENGINE DEPLOYED IN RELATION TO AN EVOLVE NODE B

CROSS-REFERENCE TO RELATED PATENTS

This application may relate to the subject matter of U.S. Pat. No. 7,426,634 entitled, "Method and apparatus for rate based denial of service attack detection and prevention", U.S. Pat. No. 7,602,731 entitled "System and method for integrated header, state, rate and content anomaly prevention with policy enforcement", U.S. Pat. No. 7,626,940 entitled "System and method for integrated header, state, rate and content anomaly prevention for domain name service", "System and Method for Integrated Header, State, Rate and Content Anomaly Prevention for Session Initiation Protocol", U.S. patent application Ser. No. 13/849,485, and "Mitigation of NTP Amplification and Reflection based DDoS Attacks", U.S. patent application Ser. No. 15/925,662 all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2019, Fortinet, Inc.

FIELD

Embodiments of the present invention relate generally to network security technology and more particularly to a system and method for the prevention of distributed denial of service (DDoS) attacks on mobile communication infrastructure specifically those using General Packet Radio Service (GPRS), Long Term Evolution (LTE) networks, GPRS Tunneling Protocol (GTP) and Stream Control Transmission Protocol (SCTP).

DESCRIPTION OF THE BACKGROUND ART

It is common knowledge that DDoS attacks have been growing with the growth of the Internet. The primary reason for this growth has been proliferation of botnets. These botnets are primarily based on personal computers, Internet of Things (IoT) devices, etc. which are intentionally and maliciously infected with bot code that can be managed by a human Botmaster.

Simultaneously, there has been growth of mobile equipment such as mobile phones, tablets, Personal Computers (PCs) using tethering to connect to the Internet, etc. In 2019, they are expected to cross 5 billion mark. The penetration is expected to cross 67 percent of the population worldwide by 2019.

There are bots being created now which are based on mobile equipment rather than just personal computers. It is easy to manage such bots and create DDoS attacks via malicious applications (so called Apps).

While Internet infrastructure has been getting ready to mitigate DDoS attacks, the mobile infrastructure is still not prepared for such attacks. The infrastructure components such as Serving Gateway (SGW), Packet Data Network Gateway (PGW) and Mobility Management Entity (MME) are still not protected from DDoS attacks because they use protocol headers that are not evaluated in the state-of-the-art equipment for DDoS attacks. Firewall equipment has recently been introduced that includes simplistic blocking features, but mitigation of rate-based denial of service attacks remains lacking.

SUMMARY

Systems and methods are described for inspection of traffic between UE and the core network to mitigate DDoS attacks on mobile networks. According to one embodiment, a method of parsing SCTP packets, and monitoring header anomalies to block anomalous packet floods. According to another embodiment of this invention, a memory table maintains requesting Si Application Protocol Identifiers (S1AP-IDs) which have sent certain commands (e.g., UE Attach messages within SCTP) and then blocking those which are sending these messages at abnormally high rates (evidencing a malicious intent). According to yet another embodiment of the present disclosure, a packet classifier parses the GTP-U protocol and unwraps the encapsulated IP packet and then monitors layer 3, 4 and 7 rate-based attacks such as User Datagram Protocol (UDP), Internet Control Message Protocol (ICMP), synchronization (SYN), Hypertext Transfer Protocol (HTTP) GET floods and drops them. Because in embodiments of the present invention such packets are dropped before they reach the Mobility Management Entity (MME), the Serving Gateway (SGW), the Packet Data Network Gateway (PGW), the Packet Data Network (PDN) or the Internet, not only is the target Internet server of the attack protected, but also the mobile infrastructure along the way.

Other features of embodiments of the present disclosure will be apparent from accompanying drawings and from detailed description that follows.

BRIEF DESCRIPTION OF THE DRAWINGS

FIG. 3 illustrates the path of an exemplary UE Attach Flood over SCTP that is addressed by embodiments of the present invention, along with legitimate traffic.

FIG. 4 illustrates deployment of a DDoS Mitigation stack before MME that is able to unwrap the SCTP protocol, detect the UE attach flood, and stop it while letting other legitimate traffic through in accordance with an embodiment of the present invention.

FIG. 7 illustrates deployment of a DDoS mitigation stack before an SGW in accordance with an embodiment of the present invention.

FIG. 7 illustrates the logical deployment of a DDoS mitigation system in the path to block floods originating from UE equipment before they can reach and destabilize equipment, such as MME, SGW, PGW, etc., and flood the subsequent target Internet server in accordance with an embodiment of the present invention.

DETAILED DESCRIPTION

Figure 1:
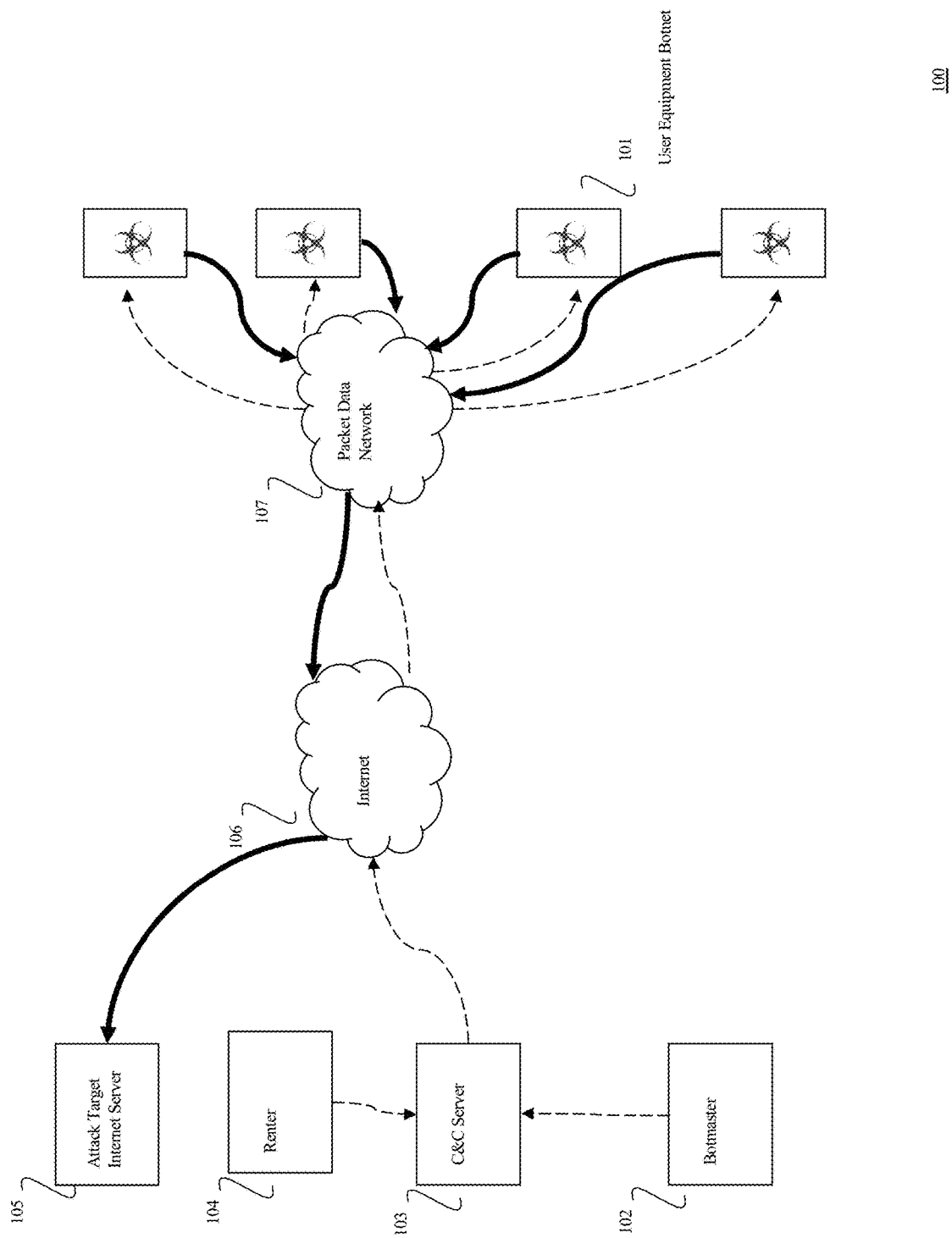
FIG. 1 illustrates a typical botnet created using User Equipment (UE).

A system and methods are described for mitigating of DDoS attacks on mobile infrastructure utilizing SCTP and GTP packets. Since normally, the infrastructure components, such as SGW, PGW, MME, do not have to parse these packets to decapsulate the internal structure of the packets. According to one embodiment, DDoS attack mitigation technology is implemented within an apparatus (e.g., a standalone DDoS attack mitigation module or one integrated within a network security appliance) that classifies SCTP and GTP packets and multiple parameters associated therewith and validates the headers for anomalies. Another component of the mitigation includes a rate monitor relating to the parameters after the packets have been decapsulated from the protocols.

Embodiments of the present disclosure may be provided as a computer program product, which may include a machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, application control, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORTIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

FIG. 1 illustrates a typical botnet created using User Equipment (UE) 101. A botnet renter 104 multiple user devices (e.g., UE 101) to attack a target Internet server 105 under instructions from a Command and Control (C&C) server 103 which is managed by a Botmaster 102 via a Packet Data Network (PDN) 107. UE 101 connects to the Internet 106 via Packet Data Network 107. These UEs 101 are managed by Botmaster 102 through bot control code. Botmaster 102 manages Command and Control (C&C) Server 103 over a network connection. C&C Server 103 is continuously polled by bot code running on UE 101 with specially written malicious code, mostly without the knowledge of the owner of the UE 101. In an exemplary attack, renter 104, with malicious intent, rents botnets (e.g., user equipment botnet 101) to launch an attack on target Internet Server 105. With a control panel meant for the renter 104, the renter 104 can program the C&C server 103 such that the botnet on UE 101 starts attacking the target Internet server 105.

Figure 2:
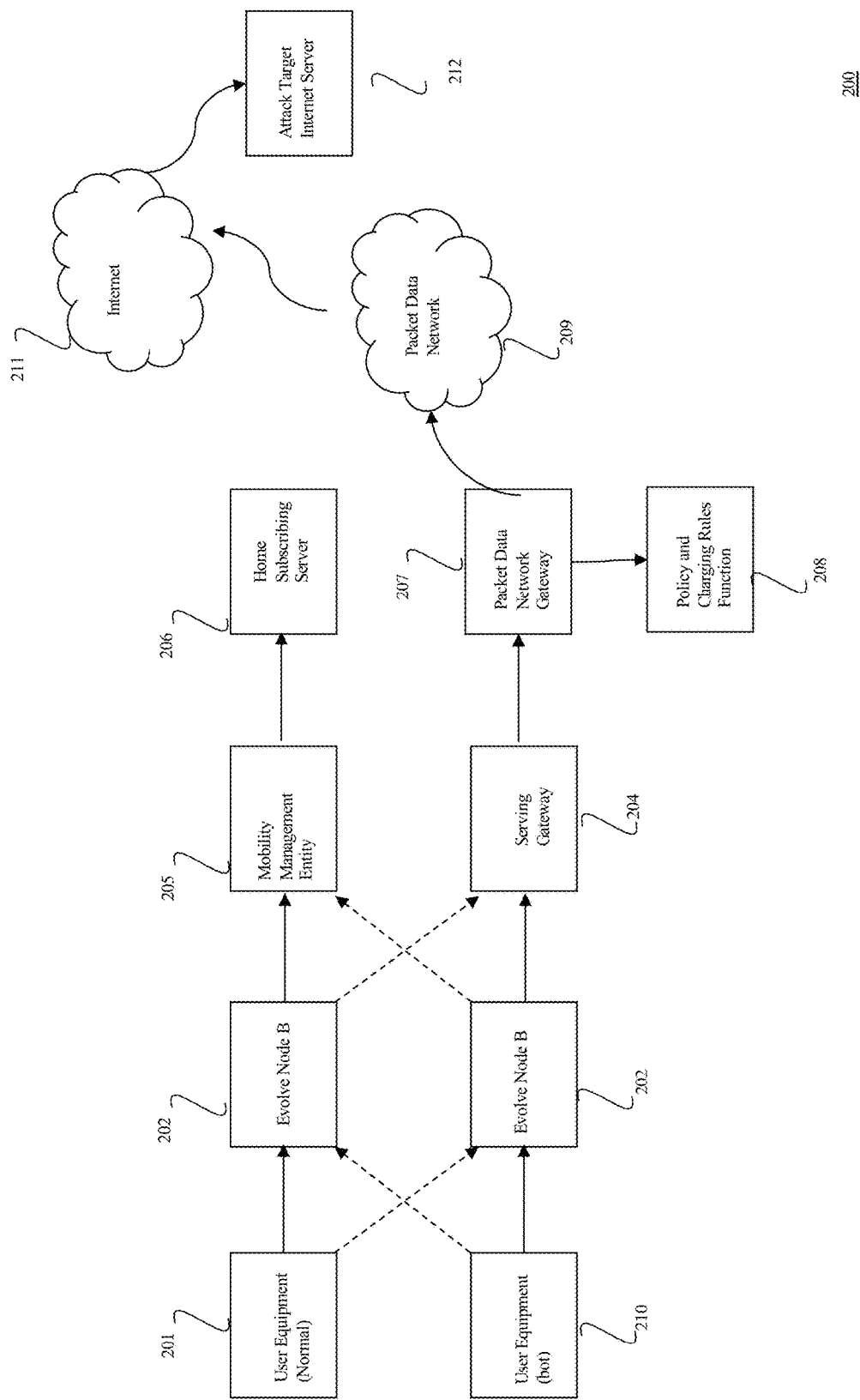
FIG. 2 illustrates a mobile communication infrastructure in which an embodiment of the present invention may be implemented.

FIG. 2 illustrates a mobile communication infrastructure 200 in which embodiments of the present invention may be implemented. In the context of the present example, mobile communication infrastructure 200 includes User Equipment (UE) communicating to a Packet Data Network (PDN)209 via Evolve Node B (eNB) 202, SGW 204, PDN Gateway (PGW) 207 and also using a Mobility Management Entity (MME) 205, Home Subscribing Server (HSS) 206, Policy and Charging Rules Function (PCRF) 208.

The User Equipment (UE) 201 communicates to Packet Data Network (PDN) 209 and subsequently to the Internet 212 via eNB 202. This communication from UE 201 to eNB 202 is wireless. eNB 202 uses the S1-AP protocol on the S1-MME interface with MME 205 for control plane traffic. The MME 205 is the key control-node for the LTE access-network. MME 205 checks the authorization of UE 201 to camp on the service provider's Public Land Mobile Network (PLMN) and enforces UE roaming restrictions. Thus, any control plane vulnerabilities are exposed via MME. Serving Gateway 204, on the other hand, routers and forwards the user data packets. PGW 207 provides connectivity from UE 201 to external packet data networks 209 by being the point of exit and entry of traffic for UE 201. It is similar to a core router in a traditional network.

HSS 206 is a central database that contains user-related and subscription-related information. HSS 206 provides mobility management, call and session establishment support, user authentication and access authorization. PCRF 208 supports service data flow detection, policy enforcement and flow-based charging. It helps better control of services and alignment of revenue with resources. When a malicious User Equipment (UE) 210 is part of a botnet, UE 210 intends to exploit vulnerabilities in the above components and intends to deny or otherwise disrupt service to legitimate users of Target Internet Server 212 via DDoS attacks in an exemplary situation addressed by embodiments of the invention.

FIG. 3 illustrates the Long Term Evolution (LTE) control plane protocol stack running on UE 201, 210, the UE side of eNB 202, the MME side of eNB 202 and on the MME 206. On UE 201 and 210, there are 6 layers, including the physical layer (PHY), Medium Access Control layer (MAC), Radio Link Control (RLC), Packet Data Convergence Protocol (PDCP), Radio Resource Control (RRC) and Non-access stratum (NAS). On eNB 202, there is a relay. On the UE side of eNB 202 stack, there are 5 layers (i.e., PHY, MAC, RLC, PDCP, and RRC). On the MME 206 side of the eNB 202 stack, there are 5 layers, including Layer 1 (L1), Layer 2 (L2), Internet Protocol (IP), SCTP and S1-AP. L1, L2 and IP layers are same as those in the traditional Internet. On the MME 206, the stack consists of 6 layers. These are L1, L2, IP, SCTP, S1-AP and NAS. NAS signaling (functions and services that are independent from the access technology) is used to convey non-radio signaling between the User Equipment (UE) and the Mobility Management Entity (MME).

In an exemplary situation addressed by embodiments of the invention, on NAS layer, the UE 210, which is part of a botnet 101, sends multiple Attach Request messages with a malicious intention to the NAS layer of the MME 205. This may be going on while other legitimate UE 201 may also be sending their respective legitimate NAS protocol requests including attach requests. Due to the flood of such requests coming from 210, user equipment, such as 201 are denied service because MME and other components are busy servicing requests from 210 and are overwhelmed.

FIG. 4 illustrates a solution to DDoS attacks in the NAS layer according to an embodiment of this invention. In the context of the present example, in order to mitigate the effects of the attack and to selectively discard the attack packets, a new layer of the protocol stack is implemented in a new system 401, which is deployed ahead of the MME 205.

In one embodiment, system 401 acts as a transparent layer 2 bridge between MME 205 and eNB 202. System 401 has a protocol stack that consists of L1, L2, IP, SCTP and NAS. In an exemplary embodiment of this invention, on NAS layer, when the UE 210, which is part of a botnet 101, sends multiple Attach Request messages with a malicious intention (e.g., as evidenced by the abnormal behavior reflected by the high rate) to the NAS layer of the MME 205, system 401 is able to decapsulate the SCTP layer and NAS layer, meter and interpret the commands and detect the presence of such abnormal rates behaviorally. When it detects such abnormal behavior, it blocks the sender's IP for a pre-configured duration. If the behavior continues, the IP keeps getting blocked. While a UE 210 with abnormal behavior is blocked, the traffic from UE 201 remains unblocked and continues normally.

TABLE 1

Structure of an exemplary UE Attach Request over IPv4

Ethernet II (Type = IPv4 0x800)
IPv4 (Protocol = SCTP (132))
SCTP Data Chunk, Payload Protocol Identifier: S1AP (18)
S1AP - PDU, initiatingMessage (0),
procedureCode: id-initialUEMessage (12)
Item 0: id-eNB-UE-S1AP-ID
Item 1: id-NAS-PDU
Item 2: id-TAI
Item 3: id-EUTRAN-CGI
Item 4: id-RRC-Establishment-Cause Table 1 depicts an exemplary UE Attach Request according to Evolved Universal Terrestrial Radio Access Network (E-UTRAN); S1 Application Protocol (SLAP). The Attach Request message is sent in the Initial UE message to the MME over the S1AP interface. The "Attach Request" is embedded in the Initial UE Message. The message also includes the PDN Connectivity Request message. The Tracking Area Identify (TAI) and E-UTRAN Cell Global Identifier (EUTRAN-CGI) are also included. Note that the eNB uses the eNB-UE-S1APID to uniquely identify the UE.

TABLE 2

Attach Request Table

| Index | UE-S1APID | IP Address | Attach Request Count | Timeout | Block Status |
|---|---|---|---|---|---|
| 0 | xxx | x.x.x.x | x | x | x |
| 1 | : | : | | | |
| : | : | : | | | |
| : | : | : | | | |
| : | : | : | | | |
| : | : | : | | | |
| $2^n$ | : | : | | | |

Table 2 depicts an exemplary memory table for tracking the attach requests in accordance with an embodiment of this invention. UE-S1APID uniquely identifies a request tuple for tracking purposes. Additional parameters viz. Attach Request Count and Timeout help timeout the entry after a certain time period so that the entry doesn't perpetually remain in memory. In one embodiment of this invention, the entry is removed when the timeout occurs. In yet another embodiment of this invention, the logic may block the S1APIID if the count of attach requests exceeds a certain pre-configured number within the timeout period. When an incoming attach request comes from a blocked S1AIPID, the request is not forwarded further and thus protects the subsequent infrastructure. In yet another embodiment of this invention, the associated IP address of the UE may be blocked from sending any further IP packets for a preconfigured time.

The hardware implementation of such tables may be performed using schemes such as hash-based addressing with a large dynamic random-access memory (DRAM), for example. Since the S1APID addresses can be 3-bytes or 4-bytes wide, while the table depth is limited to $2^n$ available spaces—as shown in Table 2—a hash-based scheme is expected to work well.

According to an embodiment of this invention, S1APID can be converted to a hash using algorithms, including, but not limited to MD5, SHA, CRC32. The depth of this table depends on the number of bits in the hash. For example, if the hash has 20 bits, the table can have 1 M entries. This 3-tuple is used to index and thus search for an incoming tuple for duplicate check or absence check.

Figure 5:
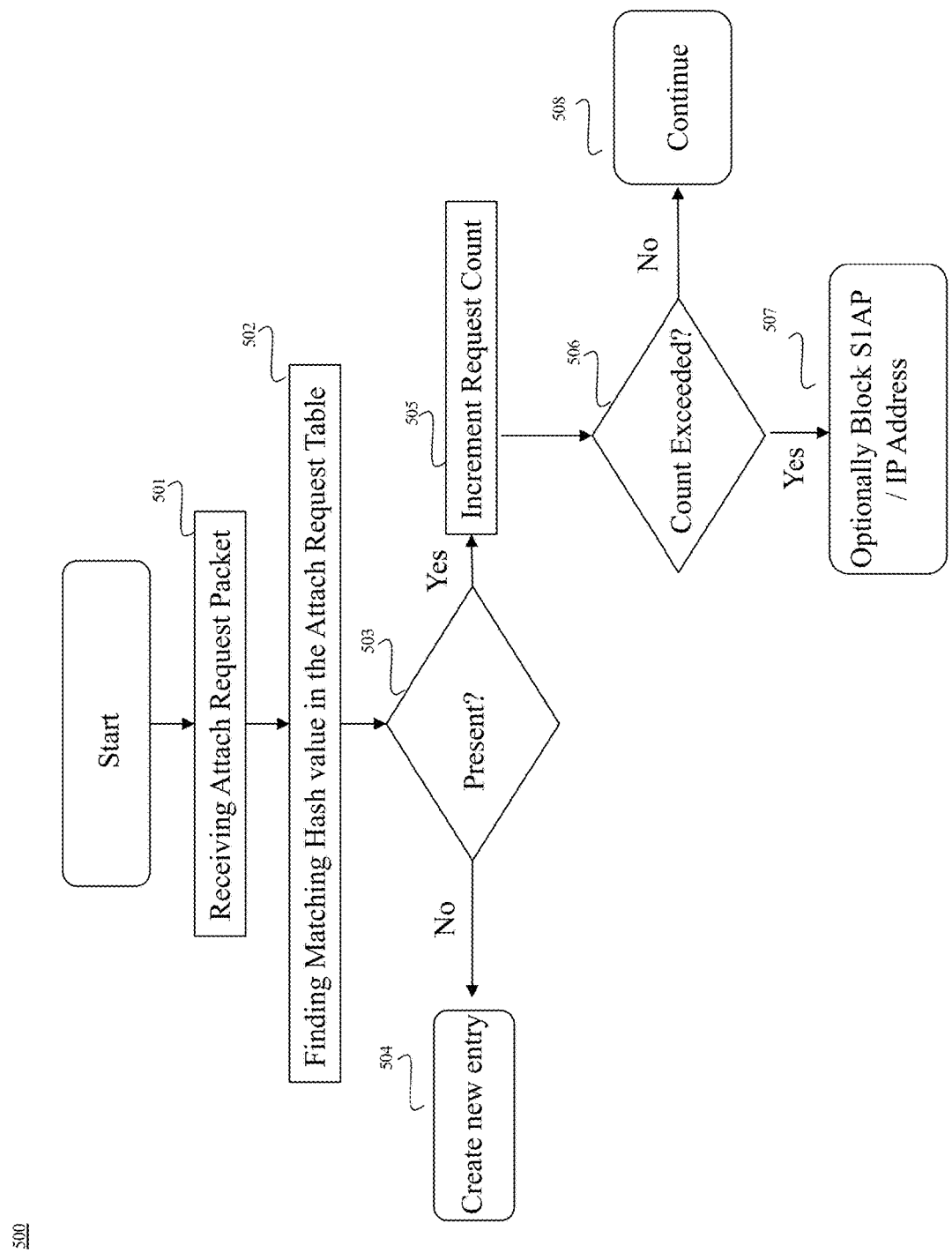
FIG. 5 is a flow diagram illustrating a general process of processing a UE attach request in accordance with an embodiment of the present invention.

FIG. 5 illustrates a flow diagram illustrating a general process of processing a UE attach request in accordance with an embodiment of the present invention.

At block 501, an attach request packet from a S1APID address of a UE is received. For example, a module of a new DDoS mitigation system (e.g., system 401) logically interposed between eNB (e.g., eNB 202) and MME (e.g., MME 205) and acting as a transparent layer 2 bridge between the eNB and the MME may inspect SCTP and NAS layer traffic from the eNB before allowing it to pass to the MME.

At block 502, the S1APID address is used to find the presence of an existing entry a memory table used for tracking attach requests. In one embodiment, the memory table is in the form described above with reference to Table 2.

At block 503, if the S1APID address does not exist in the table, a new entry is created at block 504.

When the address is already present in the table, at block 505, it means at least one request was already issued by the S1APID address at issue and an entry has already been created for this address. As such, the request count is incremented.

Depending on the administrator's configuration, if the number of requests for a particular address meet or exceed a certain threshold, the S1APID and perhaps the IP address may be blocked, this and the subsequent packets may be discarded and not allowed to reach the destination server by block 506. If the count is below the threshold, the process continues to receive the next packet in block 508.

As those skilled in the art will appreciate, the UE attach operation and the corresponding metering are meant only to exemplify one of many DDoS mitigation scenarios. Similar parsing of packets and creation of tables and blocking of operations can be implemented for other operations. Non-limiting examples of other operations include UE Context Release, UE Context modifications, UE Context Suspend, and Retrieve UE Information. Hackers can simply modify the bot code to generate any combination of operations to be repetitive or sometimes even random. By metering one or more of such operations in a manner similar to that described above, DDoS mitigation can be performed to address various other DDoS attack scenarios (e.g., malicious use of other operations issued from UE to the core network).

Figure 6:
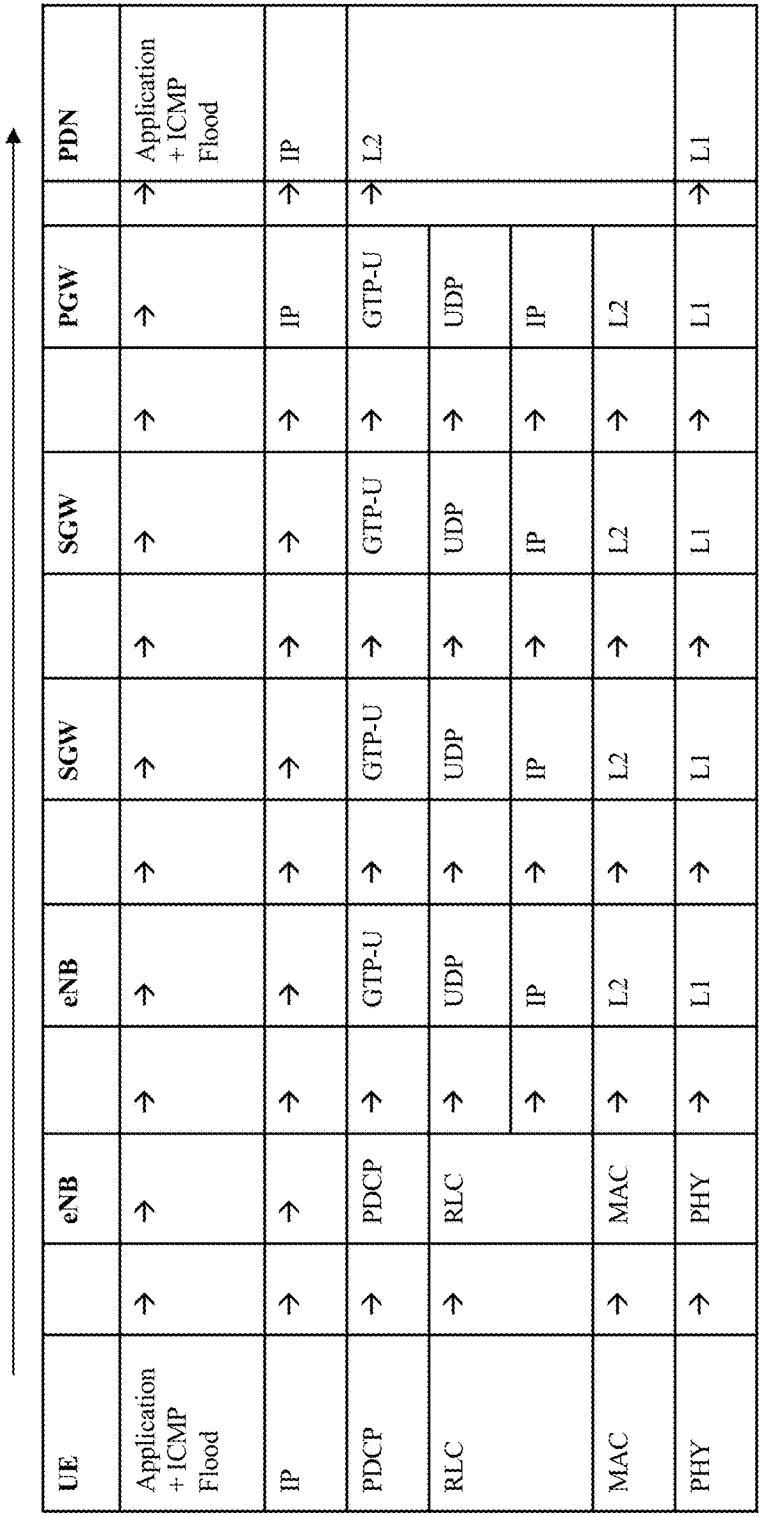
FIG. 6 illustrates the path of an exemplary ICMP flood attack via multiple network layers and multiple equipment in a mobile network.

FIG. 6 illustrates the mechanism of data transmission in Long Term Evolution (LTE) between UE and PDN Gateway that connects eventually to the Internet. In the context of the present example, the path of an exemplary ICMP flood attack via multiple network layers and multiple equipment in a mobile network is illustrated originating at UE and reaching the Packet Data Network (PDN). A GTP tunnel is dynamically established for such packets to be transmitted. Service provider networks typically use GTP to tunnel multi-protocol packets through the GPRS backbone between endpoints.

In an exemplary situation, when UE (e.g., UE 201) wants to send data to an Internet Server (e.g., Internet Server 212), IP datagrams are sent through the corresponding GTP tunnel. These IP datagrams contain the IP address of the mobile device. Additionally, these IP datagrams contain layered encapsulation headers until they reach the Packet Data Network which forwards them as Internet packet via the Internet to the Internet server 212.

Table 3 depicts an exemplary original User IP datagram that has been encapsulated within GPRS Tunneling Protocol (GTP).

TABLE 3

Structure of IP Datagram Encapsulation

| IP | UDP | GTP | IP | Payload |
|---|---|---|---|---|
| Added across LTE | | | Original User IP datagram | |

To transmit such packets from UE 201 to PDN 209 via eNB 202, SGW 204 and PGW 207, various protocol stacks are involved which are depicted in FIG. 6. On UE 201 and 210, there are 6 layers. These are physical layer (PHY), Medium Access Control layer (MAC), Radio Link Control (RLC), Packet Data Convergence Protocol (PDCP), IP and Application Layer Protocols such as HTTP running over TCP or ICMP. On eNB 202, there is a relay. On the UE side stack of eNB 202, there are 4 layers. These are PHY, MAC, RLC, and PDCP. On the SGW 204 side of the eNB 202 stack, there are 5 layers. These are Layer 1(L1), Layer 2 (L2), IP, UDP and GTP-U. L1, L2 and IP layers are same as those in the traditional Internet. On the SGW 204, the stack consists of 5 layers. These are L1, L2, IP, UDP, and GTP-U. On PGW 207, the stack consists of L1, L2, IP, UDP, GTP-U, and IP. On the PDN side of the SGW, the encapsulating outer layer is stripped off and the inner IP layer is forwarded to the PDN 209. On PDN, the inner packet which consists of L1, L2, IP and Application layer is available similar to a standard Internet packet. In an exemplary embodiment of this invention, in application layer, the UE 210, which is part of a botnet 101, sends multiple ICMP flood packets with a malicious intention to the application layer of the attack target Internet server 212. This may be going on while legitimate UE 201 may also be sending their other legitimate IP packets including genuine ICMP packets. Due to the flood of such requests coming from 210, user equipment such as 201 are denied service because SGW, PGW and server 212 are busy servicing requests from 210 and are overwhelmed.

FIG. 7 illustrates deployment of a DDoS mitigation stack 701 before an SGW in accordance with an embodiment of the present invention. DDoS mitigation stack 710, which may be implemented within a standalone hardware-logic-based system or which may be implemented within a network security appliance, is able to unwrap the GTP protocol and able to detect the exemplary ICMP flood and stop it while letting other legitimate traffic, thereby providing a solution to DDoS attacks in the IP or upper layer according to an embodiment of this invention.

To mitigate the effects of the attack and to selectively discard the attack packets, a new layer of protocol stack 701 in a DDoS mitigation device/system (not shown) is deployed ahead of the SGW 204. According to one embodiment, this device acts as a transparent layer 2 bridge between SGW 204 and the eNB 202. The DDoS mitigation device system has a protocol stack 701 that consists of the L1, L2, IP, UDP, GTP-U, IP, and higher layers such TCP, UDP, ICMP, and application layers. In an exemplary embodiment of this invention, on top of IP layer, when the UE 210, which is part of a botnet 101, sends multiple ICMP flood packets with a malicious intention to the Internet Server 212, DDoS mitigation system is able to decapsulate the GTP-U layer and the inner IP packets and their respective payloads and meter and interpret the ICMP packets and detect the presence of such abnormal rates behaviorally. When it detects such abnormal behavior, it may block the sender's IP for a pre-configured duration. If the behavior continues, the IP continues to be blocked. While UE 210 with abnormal behavior is blocked, the traffic from UE 201 including genuine (non-malicious) ICMP packets remain unblocked and continue normally.

The ICMP Flood operation and the corresponding metering are meant only for exemplifying possibilities. Similar parsing of the packets and creation of tables and blocking of operations can be implemented on other operations such as UDP flood, SYN Flood, GET Flood, NTP Flood, SIP Flood, DNS Flood, and so forth. Hackers can simply modify the bot code to generate any combination of headers to be repetitive or sometimes even random. By carefully metering such packets and their headers in a way similar to described above, those skilled in the art can create other variations.

Figure 8:
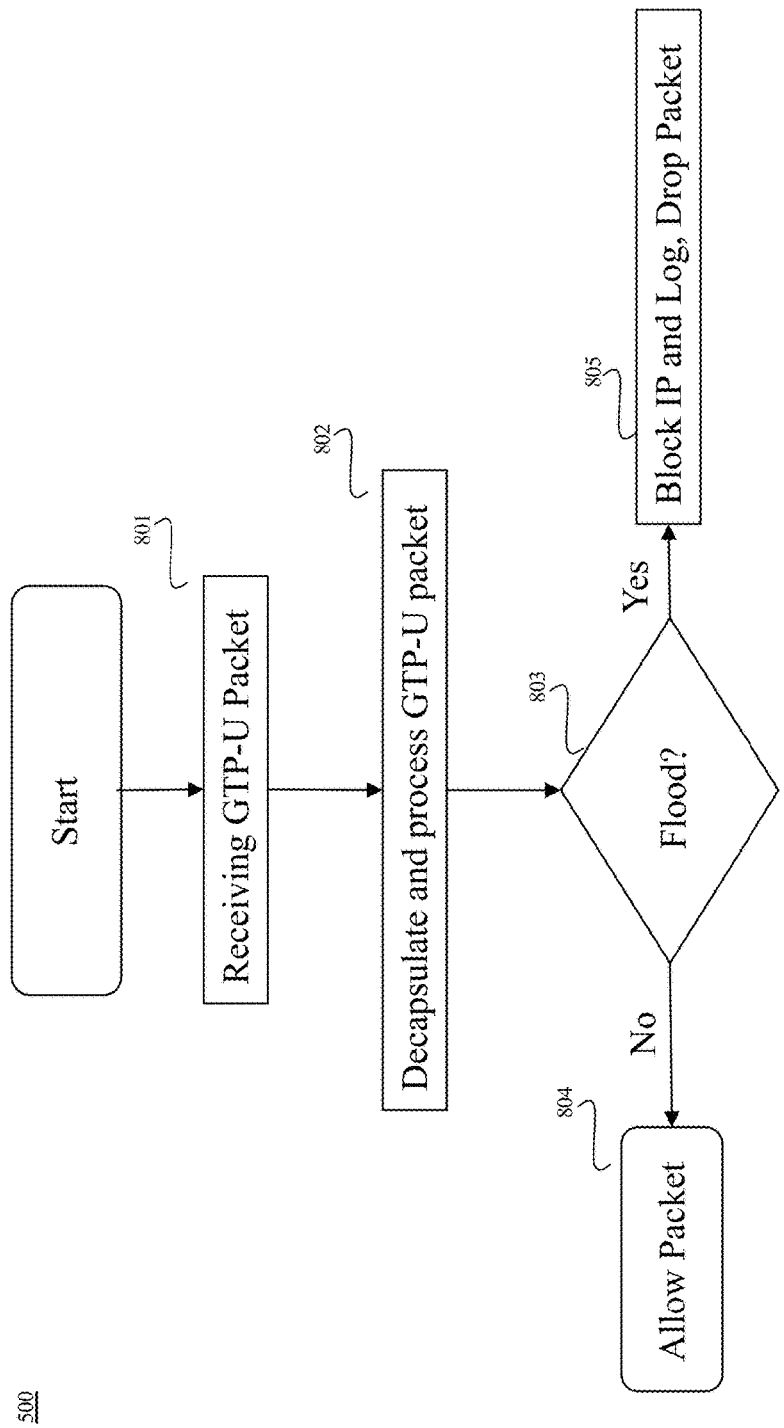
FIG. 8 is a flow diagram illustrating a general process for processing a GTP-U packet in accordance with an embodiment of the present invention.

FIG. 8 illustrates a flow diagram illustrating a general process of processing a GTP-U packet in a DDoS mitigation system in accordance with an embodiment of the present invention.

At block 801, a DDoS mitigation system receives a GTP-U packet from UE 201 or 210 via eNB 202.

At block 802, this packet is decapsulated by the DDoS mitigation system. After the packet is decapsulated, the inner IP packet is exposed. Given this IP, various header parameters from headers such as TCP, UDP, HTTP, SIP, DNS are metered. The rates of such parameters are behaviorally measured against thresholds which have been set by the administrator or the system;

At block 803, if the rates of some parameters are exceeded from predetermined thresholds, it shows the flood attack or malicious intention of the UE 210 and it must be blocked and logged in 805.

If the rates are normal, the packet is simply forwarded.

Figure 9:
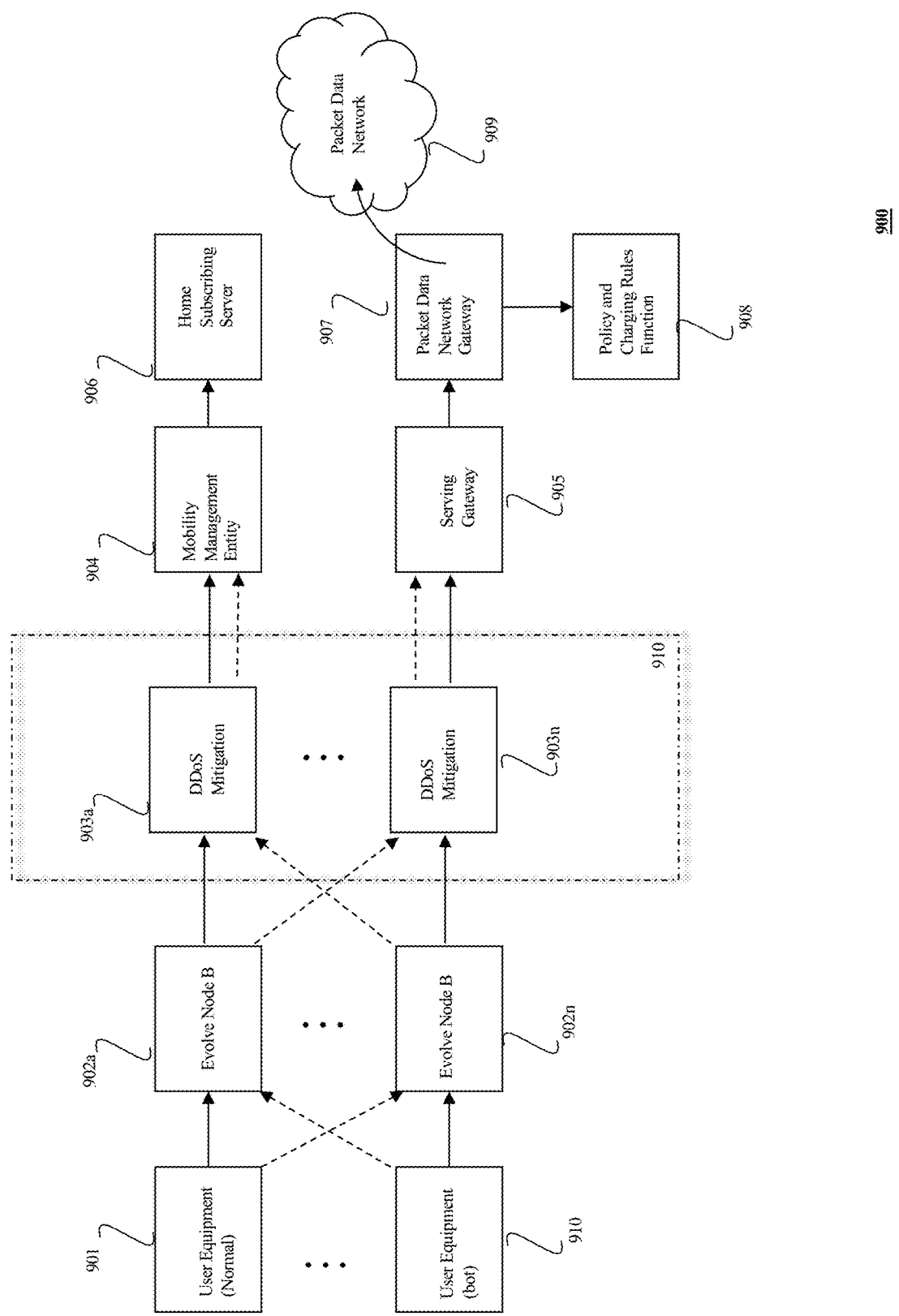
FIG. 9 illustrates a logical deployment of a DDoS mitigation system ahead of an MME and an SGW to create an improved mobile communication network in accordance with an embodiment of the present invention.

FIG. 9 illustrates a block diagram of an improved mobile communication network 900 including a DDoS mitigation system 910 in accordance with an embodiment of the present invention. In the context of the present example, DDoS mitigation system includes multiple DDoS mitigation components 903a-n deployed ahead of a MME 904 and an SGW 905 to address both SCTP and GTP-U related floods. Depending upon the particular implementation, DDoS mitigation system 910 may include fewer or more DDoS mitigation components 903.

Mobile communication network 900 may comprise multiple UEs in which UE 901 represents normal user equipment and UE 910 represents user equipment that is controlled by a botnet. UE 901 and 910 connect to eNB 902 through radio interface. eNB 902 connects to mobile communication infrastructure, such as Evolved Packet Core (EPC) that may include MME 904, Serving Gateway 905, Home Subscribing Server 906, Packet Data Network Gateway (PDN GW) 907 and Policy and Charging Rules Function module 908. PDN GW 907 connects to a Packet Data Network 909 which further connects to a network, such as the Internet. In this embodiment, one or more DDoS mitigation modules 903a-n are deployed before the mobile communication infrastructure in order to mitigate DDoS attacks originated from UE 910 before the attacks hit target components of the mobile communication infrastructure.

In an embodiment, a malicious UE 910 may send a large amount of Attach Request messages to flood MME 904 through eNB 902. Control plane traffic, such as SCTP packets, from eNB 902 are intercepted by DDoS mitigation module 903 before they are transmitted to mobile communication infrastructure. Attach Request messages to be sent to MME 904 may be parsed from control plane traffic by DDoS mitigation module 903. The rates of attach request messages from UEs are metered by DDoS mitigation module 903 in order to identify flood attacks. Once the rate of Attach Request messages from a UE, such as UE 910, is over a predetermined threshold, the Attach Request messages from the UE 910 are blocked by DDoS mitigation module 903 and normal Attach Request messages from normal UEs, such as UE 901, is forwarded to MME 904.

In another embodiment, a malicious UE 910 may send a large amount of data packets to flood SGW 905 or other components of mobile communication infrastructure through eNB 902. Data plane traffic from eNB 902 is intercepted by DDoS mitigation module 903 before it is transmitted to mobile communication infrastructure. Data plane traffic, such as GTP-U packets, from eNB 902 may be parsed to unwrap the encapsulated IP packet by DDoS mitigation module. DDoS mitigation module 903 monitors layer 3, 4 and 7 rate-based attacks of the IP packet, such as UDP, ICMP, SYN, HTTP GET floods. Once a flood attack from a UE, such as UE 910, is identified, the packets from IP address of UE 910 is blocked by DDoS mitigation module 903 and normal data plane traffic from normal UEs, such as UE 901, is forwarded to SGW 905.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 10:
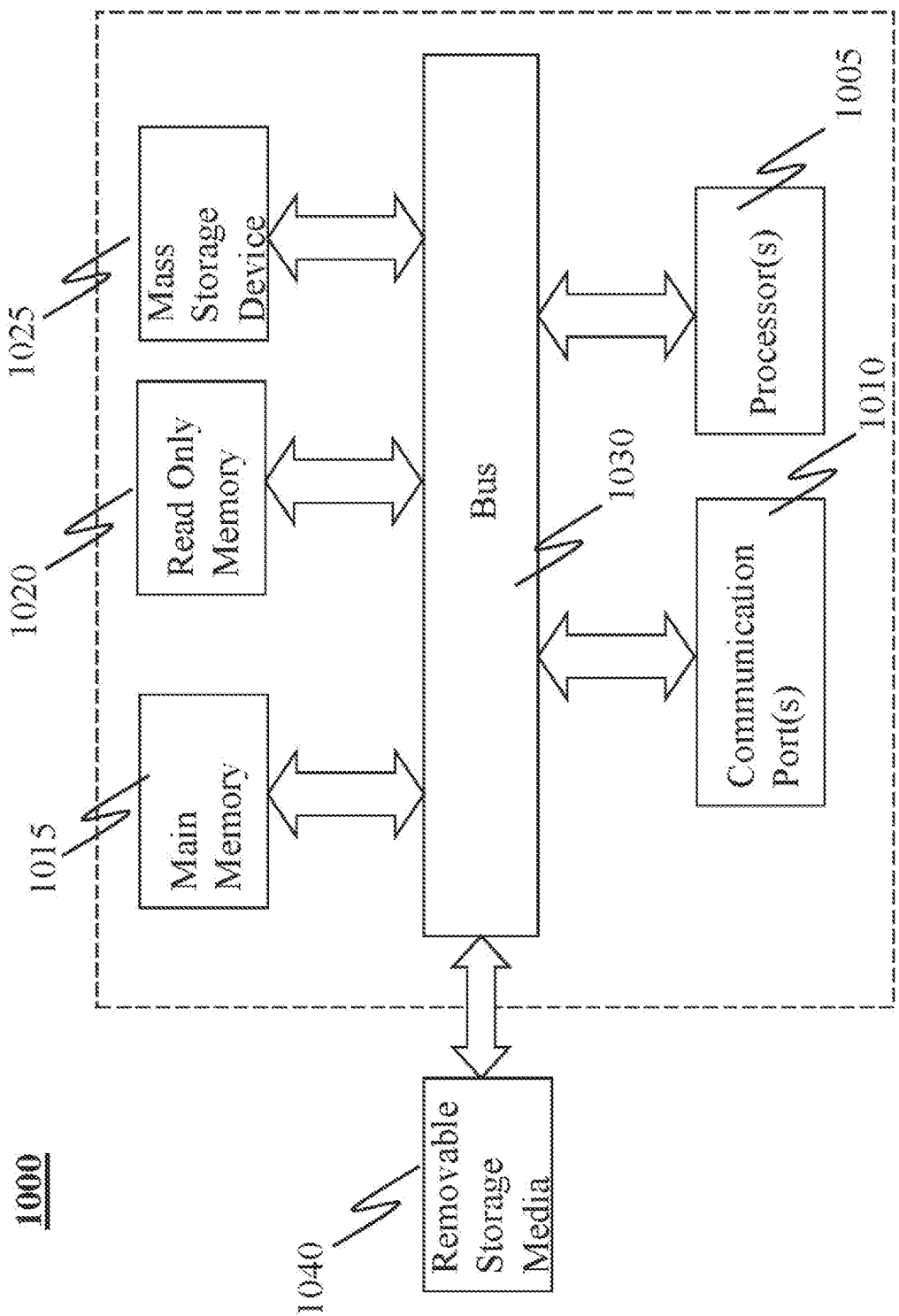
FIG. 10 illustrates an exemplary computer system in which or with which embodiments of the present invention may be utilized.

FIG. 10 is an exemplary computer system in which or with which embodiments of the present invention may be utilized. In an embodiment, computer system 1000 represents a network security device (e.g., a standalone DDoS mitigation network appliance or a UTM appliance including DDoS mitigation functionality) in which the DDoS mitigation techniques described herein may be implemented.

As shown in the figure, computer system 1000 includes an external storage device 1010, a bus 1020, a main memory 1030, a read only memory 1040, a mass storage device 1050, communication port 1060, and a processor 1070. Those skilled in the art appreciate that computer system 1000 may include more than one processor and communication ports.

Examples of processor 1070 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1070 may include various modules associated with embodiments of the present invention. Communication port 1060 can be any of an RS-232 port for use with a modem based dialup connection, a 10/100 Ethernet port, a Gigabit or 10 Gigabit port using copper or fiber, a serial port, a parallel port, or other existing or future ports. Communication port 1060 may be chosen depending on a network, such a Local Area Network (LAN), Wide Area Network (WAN), or any network to which computer system 1000 connects.

Memory 1030 can be Random Access Memory (RAM), or any other dynamic storage device commonly known in the art. Read only memory 1040 can be any static storage device(s) e.g., but not limited to, a Programmable Read Only Memory (PROM) chips for storing static information e.g., start-up or BIOS instructions for processor 1070.

Mass storage 1050 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage and communication blocks. Bus 1020 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1070 to software system. Optionally, operator and administrative interfaces, e.g. a display, keyboard, and a cursor control device, may also be coupled to bus 1020 to support direct operator interaction with computer system 1000. Other operator and administrative interfaces (not shown) can be provided through network connections connected through communication port 1010.

External storage device 1040 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Although embodiments of the present invention and their various advantages have been described in detail, it should be understood that the present invention is not limited to or defined by what is shown or discussed herein.

Moreover, as one skilled in the art will appreciate, any digital computer systems can be configured or otherwise programmed to implement the methods and apparatuses disclosed herein, and to the extent that a particular digital computer system is configured to implement the methods and apparatuses of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

What is claimed is:

1. A method comprising:
   deploying a distributed denial of service (DDoS) detection engine between an Evolve Node B (eNB) and other components of a mobile communication infrastructure;
   intercepting, by the DDoS detection engine, a network packet of a control plane or a data plane transmitted from the eNB to one or more of the other components of mobile communication infrastructure; and
   determining if the network packet is a flood packet that came too soon from an originating user equipment (UE) to the components of the mobile communication infrastructure.

2. The method of claim 1, wherein the network packet from the control plane comprises a Stream Control Transmission Protocol (SCTP) request packet.

3. The method of claim 2 further comprising prior to the SCTP request packet reaching a Mobility Management Entity (MME) of the mobile communication infrastructure, determining whether the SCTP request packet is a flood packet that came too soon from the originating UE based on an S1 Application Protocol Identifier (S1AP-ID) associated with the UE.

4. The method of claim 3 further comprising storing, by the mobile network DDoS detection engine, a hash value of each of a plurality of monitored S1AP-IDs in a hash table in a memory of the mobile network DDoS detection engine.

5. The method of claim 3, further comprising:
   determining, by the mobile network DDoS detection engine, whether the SCTP request packet was originated by a different S1AP-ID than previously observed and, if so, adding an entry including the different S1AP-ID to the hash table; and
removing, by the mobile network DDoS detection engine, the table entry from the hash table when the entry times out.

6. The method of claim 1, wherein the network packet of the data plane comprise a General Packet Radio Service (GPRS) Tunneling Protocol (GTP) user plane (GTP-U) encapsulated packet.

7. The method of claim 1, further comprising determining, by the mobile network DDoS detection engine, whether the network packet is a flood packet directed to a Serving Gateway (SGW) of the mobile communication infrastructure and originated from a previously observed user equipment (UE) associated with the mobile communication infrastructure based on an Internet Protocol (IP) address of the UE.

8. The method of claim 7, further comprising decapsulating layer 3, 4 or 7 of the GTP-U packet.

9. The method of claim 8, further comprising:
   determining, by the mobile network DDoS detection engine, if the decapsulated GTP-U packet contains a same parameter type that is among one or more currently blocked header parameters; and
when said determining is affirmative, dropping and logging, by the mobile network DDoS detection engine, the GTP-U packet.

10. The method of claim 9, wherein the header parameters are indicative of a rate-based attack associated with one or more of a User Datagram Protocol (UDP) flood, an Internet Control Message Protocol (ICMP) flood, a SYN flood, and a Hypertext Transfer Protocol (HTTP) GET flood.

\* \* \* \* \*